(12) United States Patent
Johnson et al.

(10) Patent No.: US 7,764,678 B2
(45) Date of Patent: Jul. 27, 2010

(54) ROUTING BASED ON DYNAMIC CLASSIFICATION RULES

(75) Inventors: Darrin P. Johnson, Mountain View, CA (US); Kais Belgaied, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 516 days.

(21) Appl. No.: 11/545,399

(22) Filed: Oct. 10, 2006

(65) Prior Publication Data
US 2008/0084866 A1 Apr. 10, 2008

(51) Int. Cl.
*H04L 12/28* (2006.01)
(52) U.S. Cl. .......... 370/389; 370/351; 370/392; 370/237
(58) Field of Classification Search .......... 370/389, 370/351, 392, 237
See application file for complete search history.

(56) References Cited

U.S. PATENT DOCUMENTS

| | | | | |
|---|---|---|---|---|
| 5,570,359 A | * | 10/1996 | Nguyen | 370/401 |
| 7,386,628 B1 | * | 6/2008 | Hansell et al. | 709/238 |
| 2006/0015648 A1 | * | 1/2006 | Lappin et al. | 709/246 |
| 2006/0153242 A1 | * | 7/2006 | Krause et al. | 370/493 |
| 2007/0047446 A1 | * | 3/2007 | Dalal et al. | 370/237 |
| 2007/0124495 A1 | * | 5/2007 | Sreejith | 709/238 |

* cited by examiner

*Primary Examiner*—Dang T Ton
*Assistant Examiner*—Pamit Kaur
(74) *Attorney, Agent, or Firm*—Park, Vaughan & Fleming LLP; Steven E. Stupp (57) ABSTRACT

A computer system that forwards data packets is described. During operation, the system receives a data packet on a first interface and classifies the data packet to determine a corresponding destination. This classification is based on dynamically configured classification rules that include multiple attributes corresponding to multiple layers in an Open System Interconnect (OSI) Reference model. Then, the system provides the data packet on a second interface corresponding to the destination.

19 Claims, 6 Drawing Sheets

ROUTING BASED ON DYNAMIC CLASSIFICATION RULES

BACKGROUND

1. Field of the Invention

The present invention relates to techniques for forwarding or routing information.

2. Related Art

Organizations running mission-critical Internet applications often use scalable, secure and fault-tolerant server farms. In such systems, workloads need to be properly balanced between the servers in order to optimize response time for client transactions, and in order to maximize server utilization. Current load-balancing solutions use either pure-hardware and pure-software approaches.

In pure-hardware approaches, devices are configured to parse data packets on the fly. In addition, these devices are configured to perform certain actions based on pre-defined attributes or fields associated with the data packets. For example, some existing routers are capable of content switching based on a Uniform Resource Locator (URL) value.

Although such hardware solutions are fast, they have a number of limitations. For example, it is difficult to program the devices to handle new or arbitrary switching (classification) criteria. In addition, the devices do not usually offer control beyond the providing the ability to specify target servers for each type of content. For example, in existing systems it may not be possible to allocate bandwidth on a per class basis.

In pure-software approaches (such as proxy servers), user-level load balancing software typically provides some flexibility. However, these solutions are vulnerable to denial of service attacks and require a significant amount of overhead. In particular, a minimum of two context switches and crossing of the Transmission Control Protocol/Internet Protocol (TCP/IP) stack are typically required for transactions to be delivered to an application on a front-end load-balancing application. Only then can the associated data packets forwarded to the handling server. These limitations increase system complexity and expense.

Hence what is needed is a method and an apparatus that facilitates load-balancing while routing data packets without the above-described problems.

SUMMARY

One embodiment of the present invention provides a computer system that forwards data packets. During operation, the system receives a data packet on a first interface and classifies the data packet to determine a corresponding destination. This classification is based on dynamically configured classification rules that include multiple attributes corresponding to multiple layers in an Open System Interconnect (OSI) Reference model. Then, the system provides the data packet on a second interface corresponding to the destination.

In some embodiments, the system provides the data packet on a third interface. Furthermore, in some embodiments the second interface includes two interfaces and the data packet is provided on at least one of the two interfaces.

In some embodiments, the first interface includes a physical interface or a virtual interface, and the second interface includes a physical interface or a virtual interface.

In some embodiments, the classification is implemented in hardware and/or in software. In addition, the multiple layers may include a Data Link layer, a Network layer, a Transport layer, a Session layer, and/or an Application layer. And in some embodiments, the classification is also based on an address associated with the data packet.

In some embodiments, the classification is based on an identifier for a sequence of data packets. For example, the identifier may correspond to a Media Access Control (MAC)-level classification. In order to determine this MAC-level classification, the system may, in hardware and/or software, apply a hash function to a portion of a data packet in the sequence of data packets to generate a single hash value for the data packet. Next, the system may divide the single hash value into multiple sections. Then, the system may determine the MAC-level classification based on these multiple sections.

In some embodiments, the multiple attributes include a type of service associated with the data packet, a transport protocol associated with the data packet, and/or a communication port associated with the data packet. Furthermore, in some embodiments the multiple attributes include a virtual-local-area-network tag associated with the data packet, a MAC address associated with the data packet, a service-access-point value associated with the data packet, and/or a label for secure routing associated with the data packet.

Another embodiment provides a method including at least some of the above-described operations.

Another embodiment provides a computer program product for use in conjunction with the computer system. The computer program product includes a a non transitory tangible computer-readable storage medium and a computer-program mechanism embedded therein for forwarding data packets.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer program product (i.e., software) for use with the computer system are described. These systems and processes may be used to forward data packets. In particular, the data packets may be switched, routed, bridged, and/or forwarded from an input interface to an output interface based on a classification of the data packets. This classification may be determined in hardware and/or in software based on classification rules that are dynamically configured. Such classification rules may include an arbitrary combination of attributes associated with the data packets. These attributes may correspond to multiple layers in an Open System Interconnect (OSI) Reference model, such as a Data Link layer, a Network layer, a Transport layer, a Session layer, and/or an Application layer. For example, these attributes may include a type of service, a transport protocol, and/or a communication port associated with one or more of the data packets.

In some embodiments the classification is also based on one or more addresses associated with one or more of the data packets and/or an identifier for a sequence of data packets (such as a MAC-level classification). Moreover, the input interface and/or the output interface each may include a physical interface or a virtual interface. Also note that the classification may be implemented in hardware and/or in software.

The data packets may be received and transmitted over a network, such as the Internet or World Wide Web (WWW), an Intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

We now describe embodiments of a computer system, a method, and software for forwarding data packets. Switches, bridges, and routers (henceforth referred to as routers) are described that determine destinations for data packets by classifying the data packets based on classification rules. These routers may be implemented in hardware and/or in software, and may also be, configured to dynamically configure (i.e., to dynamically change) the classification rules in order to manage dynamic data flows and to balance loads in computer systems. In addition, the classification rules may include one or more attributes or fields associated with the data packets. These attributes or fields may correspond to multiple layers in a network hierarchy, such as existing OSI Reference model 100 provided in FIG. 1.

Figure 1:
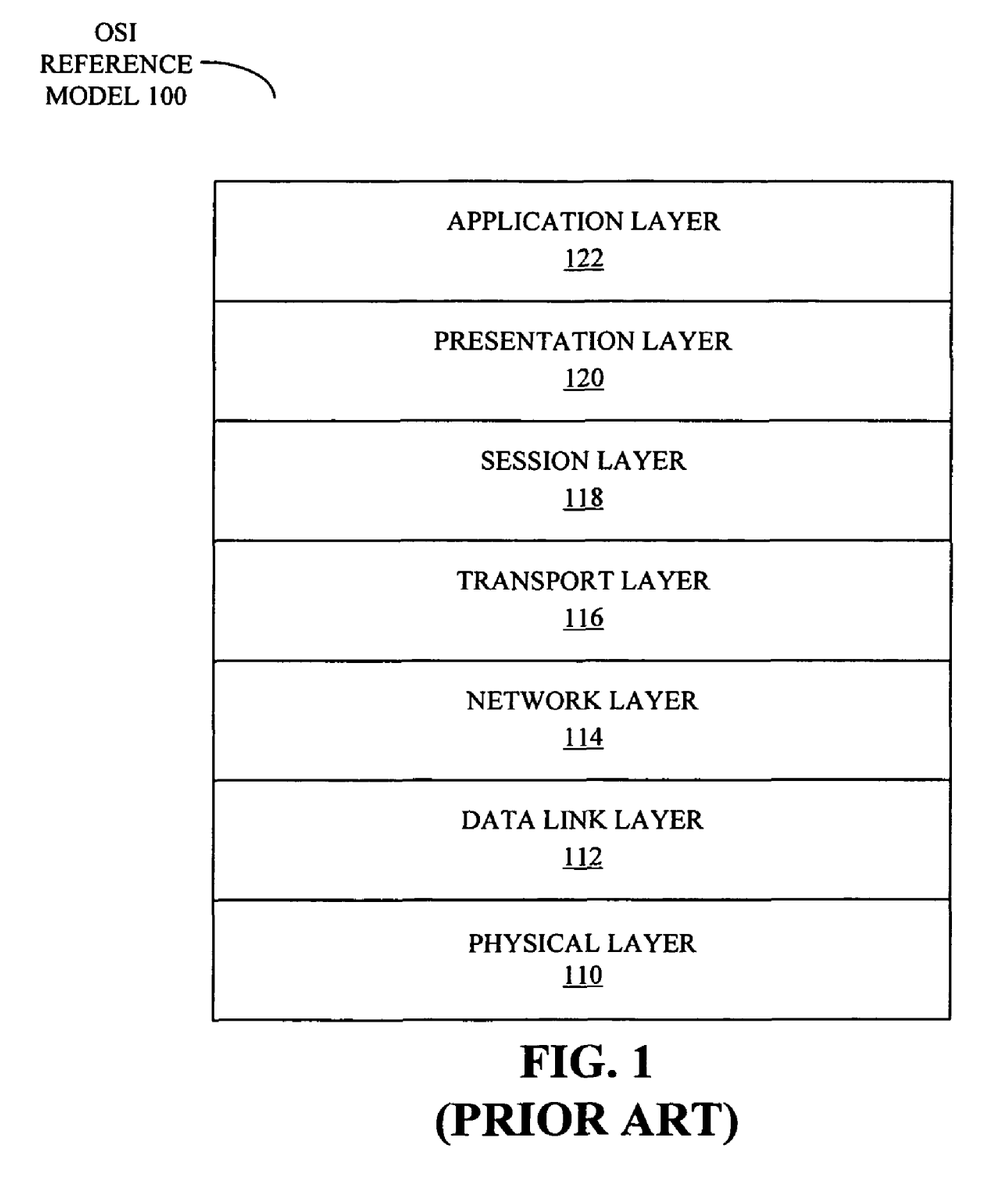
FIG. 1 is a block diagram illustrating layers in an existing Open System Interconnect (OSI) Reference model.

In the OSI Reference model 100, each layer performs services for the next higher layer in the hierarchy and makes requests of the next lower layer. Note that a given layer may be implemented in hardware or in software. Also note that layers in the OSI Reference model 100 may be grouped into media layers (including physical layer 110, data link layer 112, and network layer 114) and host layers (including transport layer 116, session layer 118, presentation layer 120, and application layer 122).

In the media layers, Physical layer 110 (layer 1) defines all of the electrical and physical specifications for devices that are communicating with each other. For example, this layer modulates signals and performs data communication. Moving up the hierarchy, Data link layer 112 (layer 2) handles addressing using a Media Access Control (MAC) protocol and/or a Logical Link Control (LLC) protocol. For example, this layer may be used to perform simple switching and bridging functions. And Network layer 114 (layer 3) performs logical addressing such as that used in network routing. An example of a layer 3 protocol is the Internet Protocol (IP).

In the host layers, Transport layer 116 (layer 4) provides transparent, reliable data transfer between end users. An example of a layer 4 protocol is the Transmission Control Protocol (TCP). Session layer 118 (layer 5) establishes, manages, and terminates dialogs or sessions, and Presentation layer 120 (layer 6) transforms data using encryption and/or data compression protocols. Application layer 122 (layer 7) provides an interface for users to interact with applications. Note that Layer 7 protocols include the Hypertext Transfer Protocol (HTTP).

Figure 2:
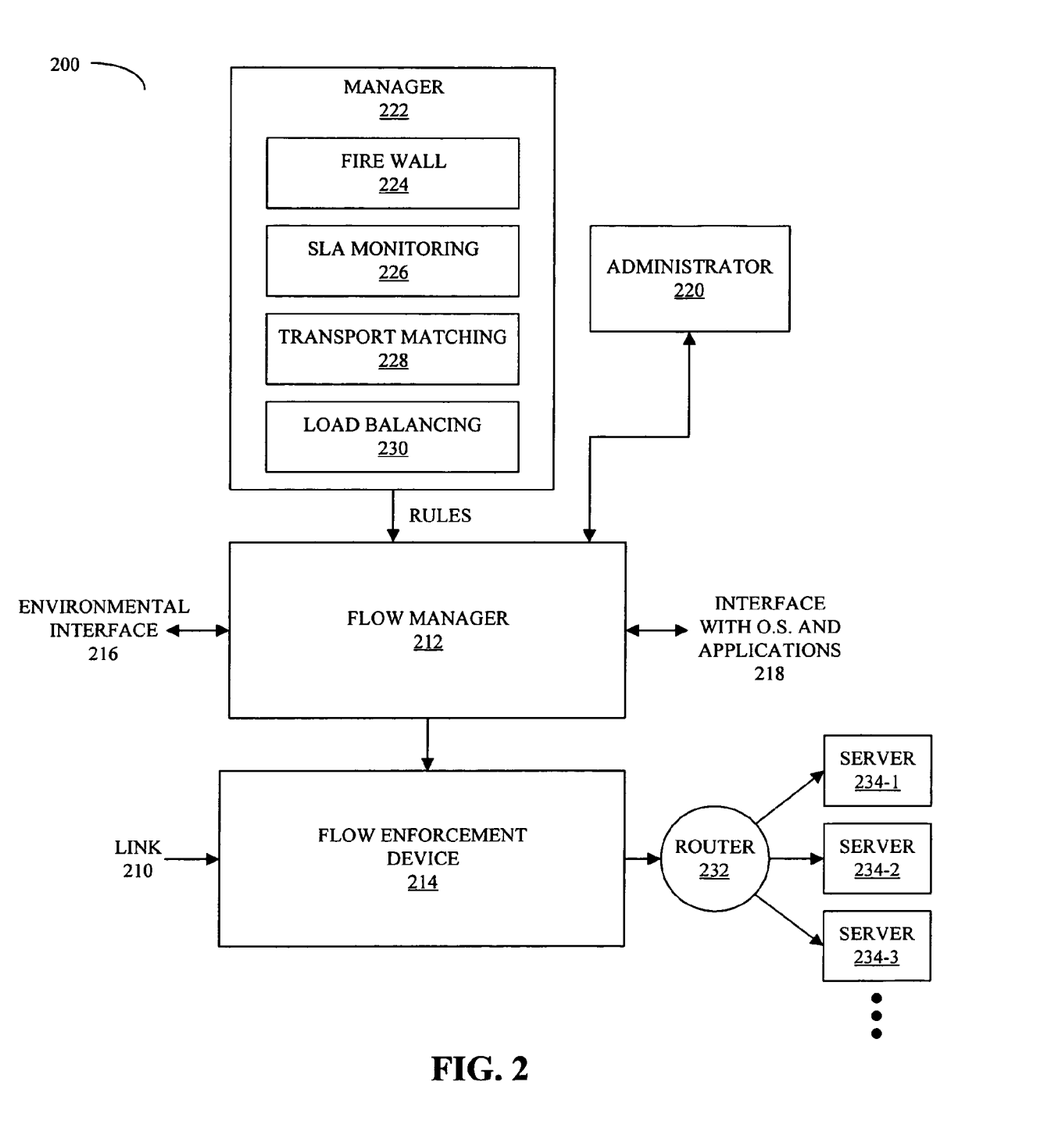
FIG. 2 is a block diagram illustrating a system that handles data packet flows in accordance with an embodiment of the present invention.

FIG. 2 provides a block diagram illustrating a system 200 that handles data packet flows in accordance with an embodiment of the present invention. This system includes flow manger 212 and flow enforcement device 214. During operation, flow enforcement device 214 receives data packets from high-speed link 210 and routes the data packets through router 232 to servers 234. Note that flow enforcement device 214 may also perform simple operations on the data packets, such as translating packet headers.

Flow manager 212 generates a consistent set of rules for flow enforcement device 214 based on rules received from various components, such as administrator 220 and/or manager 222. An exemplary set of components in manager 222 includes firewall management component 224, Service Level Agreement (SLA)-monitoring management component 226, transport-matching management component 228, and/or load-balancing management component 230. Note that this exemplary set of components is provided for purposes of illustration only. In general, the system 200 may include many other different types of components. Also note that rules from different components may potentially conflict. In this circumstance, rules from one or more of the components in the manager 222 may be given priority over the rules from other components.

In terms of function, firewall management component 224 may provide security rules associated with the firewall functions performed by an edge router in the system 200. For example, firewall management component 224 may implement an access-control policy that only allows specific data packets to reach the servers 234. In addition, SLA-monitoring component 226 may provide rules associated with monitoring-service-level agreements for customers that make use of the servers 234.

Transport-matching management component 228 matches a network data flow with an underlying transport protocol (i.e., one corresponding to Transport layer 116 in FIG. 1), such as TCP/IP. Note that a source of a data flow often assumes that the destination uses the same protocol. However, the destination (such as the system 200) may use a different protocol for reasons of efficiency or backward compatibility. For example, some companies are considering the use of Infiniband (IB) in a server cluster. In order for this to work, a mechanism needs to terminate a received TCP data flow and initiate an IB data flow within the cluster. This process is known as "transport matching."

Load-balancing management component 230 routes data packets to the servers 234 in a manner that balances the load between these servers. For example, if one server (such as server 234-1) is heavily loaded, load-balancing management component 230 may route a new data flow to a server (such as server 234-2) that currently has a reduced load.

Note that in some embodiments flow manager 212 may also receive inputs from other sources, such as administrator 220. For example, the administrator 220 may issue commands that specify how to route specific data flows and/or how to prioritize network services. In addition, flow manager 212 may receive inputs from an environment interface 216 that communicates with environment agents and/or from another interface 218 that communicates with an operating system and applications running on the servers 234.

Flow manager 212 may consider these inputs and rules in creating a single consistent set of data flow rules that may be used by flow enforcement device 214. In some embodiments, each of the data-flow rules specifies a filter that defines or classifies a set of data packets in the data-packet flow as well as a list of actions to be applied to this set of data packets. In this way, the filter may be used to identify data packets that the flow rule applies to, and corresponding actions may then be applied to the identified data packets. Furthermore, in some embodiments flow enforcement device 214 is configured such that longer rule patterns match before shorter rule patterns.

As discussed further below, in some embodiments the rules may be applied by the flow enforcement device 214 in real time or on-the-fly (as opposed to off-line processing). In addition, in some embodiments data packets may at least be partially classified before the system 200 knows what to do with the data packets. Thus, data packets that are initially anonymous may be partially processed at a low level in the system 200 before the purpose or application associated with these data packets is identified. For example, filters may be used to pre-process data packets prior to full classification and routing to corresponding destination(s). This pre-processing may determine an identifier for a sequence of data packets. Note that the identifier may correspond to a Media Access Control (MAC)-level classification.

In order to determine this MAC-level classification, the system 200 may apply one or more hash functions to a portion of a given data packet in a sequence of data packets to generate a single hash value for the given data packet. Next, the system 200 may divide the single hash value into multiple sections. Then, the system may determine the MAC-level classification based on the multiple sections, for example, by using Bloom filters to match the multiple sections to a corresponding node. In this way, data packets may be at least partially classified based on multiple criteria, including IP destination address, service type, and/or protocol.

Note that in some embodiments the system 200 may include fewer or additional components, two or more components may be combined into a single component, and/or a position of one or more components may be changed; For example, as discussed below some or all of the functions of the flow manager 212, the flow enforcement device 214, and the router 232 may be combined into a single component.

Figure 3:
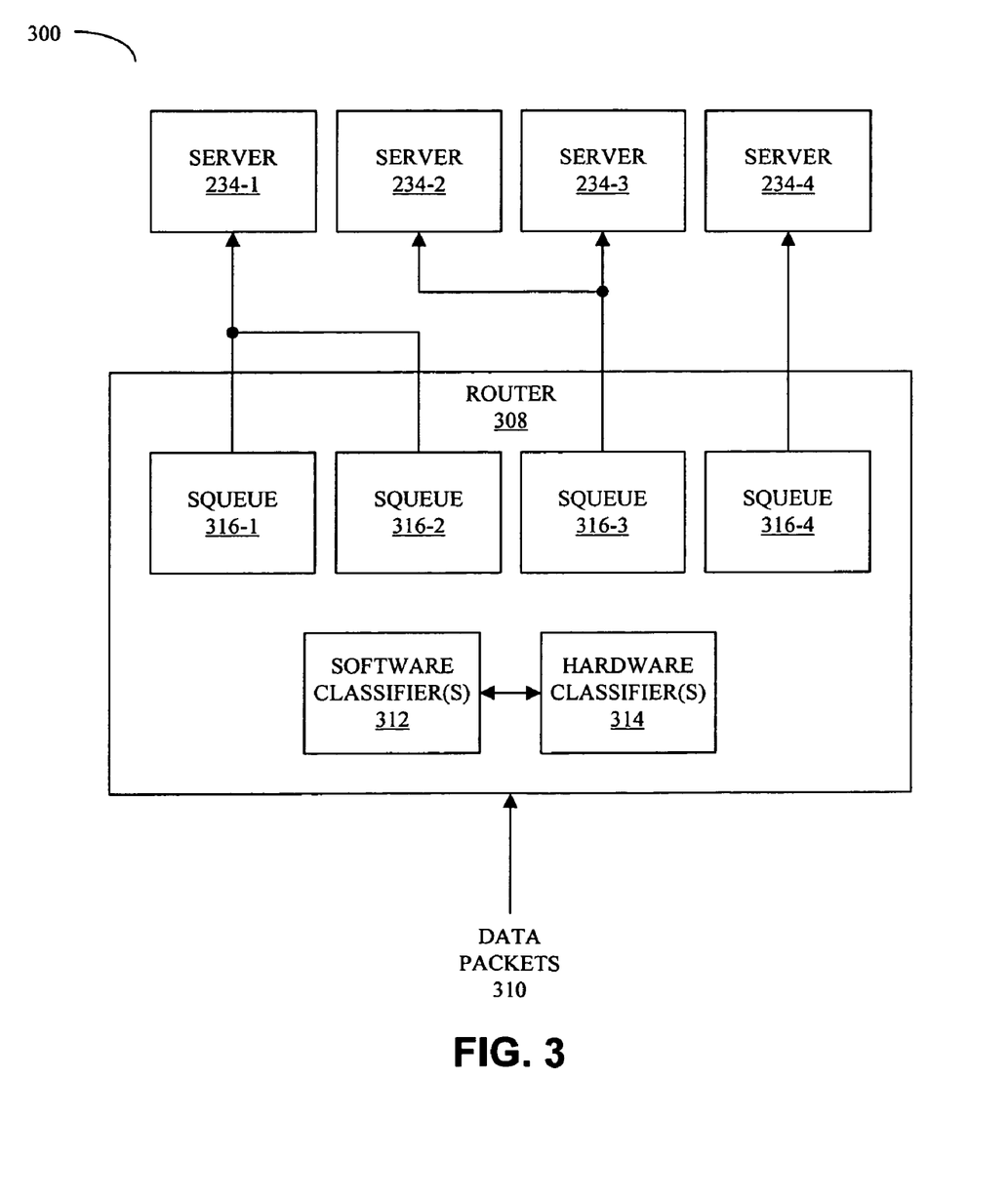
FIG. 3 is a block diagram illustrating a system that handles data packet flows in accordance with an embodiment of the present invention.

As described previously, the data packets may also be routed based on dynamically configured classification rules. In an exemplary embodiment, the data packets are classified and placed into queues after they have been pre-processed (for example, using MAC-level classification information to determine or identify a data flow). This is illustrated in FIG. 3, which provides a block diagram illustrating a system 300 that handles data packet flows in accordance with an embodiment of the present invention.

During operation of this system, data packets 310 are received by router 308. These data packets may be received on one or more physical interfaces (such as a network interface card or NIC) and/or one or more virtual interfaces (such as a virtual local area network or VLAN). The data packets 310 are then assigned a classification using one or more software classifiers 312 and/or one or more hardware classifiers 314. In particular, one or more of the hardware classifiers 314 may be used when available and/or when a given classification rule may be expressed or implemented in hardware. And one or more of the software classifiers 312 may be used to complement (partially or entirely) the hardware classifiers 314. In some embodiments, the software classification rules are implemented as flow tables that reside in the operating system (for example, there may be one flow table for each NIC or interface).

Note that the classification rules may include an arbitrary combination of attributes or fields corresponding to multiple layers in a network hierarchy, such as the OSI Reference model 100 (FIG. 1). Thus, in the general case classification rules may be based on the 6-tuple associated with one or more data packets.

For hardware classifiers 314, the classification rules may include a destination address for the data packets (layer 2 information), one or more destination IP addresses for the data packets (level 3 information), a transport protocol associated with the data packets (layer 4 information), a destination or communication port for the data packets (level 4 information), an Secure Socket Layer (SSL) session identifier (level 5 information), and/or a service associated with the data packets (layer 7 information). For example, data packets may be routed based on associated Extensible Markup Language (XML) tags or URL.

For software classifiers 312, the classification rules may include policy-based routing (selective forwarding). Thus, routing may be based on packets that match IPv6 (as opposed to IPv4). In addition, in some embodiments the classification rules are used to differentiate interfaces based on speed. For example, data packets may be routed based on the use of HTTP as opposed to HHTP over SSL (HTTPS), i.e., data traffic from a low bandwidth server versus data traffic from a high bandwidth server. Furthermore, data packets may be routed based on multi-cast traffic from one server (such as that associated with a User Datagram Protocol) or TCP traffic going to another server.

In another example, a given data packet may be routed to a given processor based on as associated interface. This type of forwarding may use an interrupt or a worker thread in the operating system. In embodiments with secure data flows, all encrypted data packets may be routed to a location that is optimized for cryptographic processing. Furthermore, in some embodiments the multiple attributes may include a VLAN tag associated with the given data packet, a MAC address associated with the data packet, a service-access-point (SAP) value associated with the data packet, and/or a label for secure routing associated with the data packet.

Once the data packets have been classified (based on a best match to the current classification rules), they may be steered (de-multiplexed) into one or more appropriate receive rings or queues. In an exemplary embodiment, the one or more queues include serialization queues (squeues) 316. A given squeue (such as squeue 316-1) is associated with a corresponding worker thread in a multi-thread system. In some embodiments, there is one worker thread per processor in the system 300, thereby eliminating a need for locking in the system 300. Furthermore, a given thread may execute in the perimeter of a corresponding squeue when code for an associated data packet is the only one being executed by the corresponding processor.

In some embodiments, the system 300 dynamically defines one or more squeues 316 for a data flow of data packets. In addition, the worker thread for a given squeue operates at the rate of the associated data flow (for example, 100 MB/s). Thus, the router 308 is able to forward data packets at this rate.

The router 308 may also route data packets 310 to select machines or servers 234. As illustrated by the coupling between squeue 316-3 and servers 234-2 and 234-3, a given data packet may be routed to more than one destination. In addition, data packets from more than one squeue may be routed to a server. This is illustrated by the coupling of squeues 316-1 and 316-2 to server 234-1. Thus, the system 300 may be configured to aggregate and/or duplicate data flows.

In an exemplary embodiment, there are 16 rings or squeues 316 in the system 300, 15 of which are for the hardware classifiers 314 and one is for the software classifiers 312. This last squeue may be used if the 15 hardware receive rings or squeues are full.

In another exemplary embodiment, the current classification rule in the router 308 may specify that data packets from SRC A (level 3 information) and asking for URL http://www.sun.com (level 7 information) take route X, while packets from SRC B asking for the same URL take route Y.

The ability to leverage hardware and/or kernel processing to classify data packets based on dynamically configured classification rules (which is also known as criteria-based segmentation) may allow dynamic shaping of data flows or traffic, such as prioritization, bandwidth control, intermediate processing, etc. Such control of the flow of data packets and how they are used may enable more efficient routing/forwarding of data packets. In addition, this approach may reduce complexity of the system 300, for example, by removing memory for off-line processing of data packets.

Note that in some embodiments the system 300 includes fewer or additional components, two or more components are combined into a single component, and/or a position of one or more components may be changed. In addition, while the embodiment illustrated in FIG. 3 shows a unidirectional data flow, in other embodiments the router 308 may handle bi-directional data flows. Note that there may be different routing policies (i.e., different classification rules) for each direction of data flow.

Figure 4:
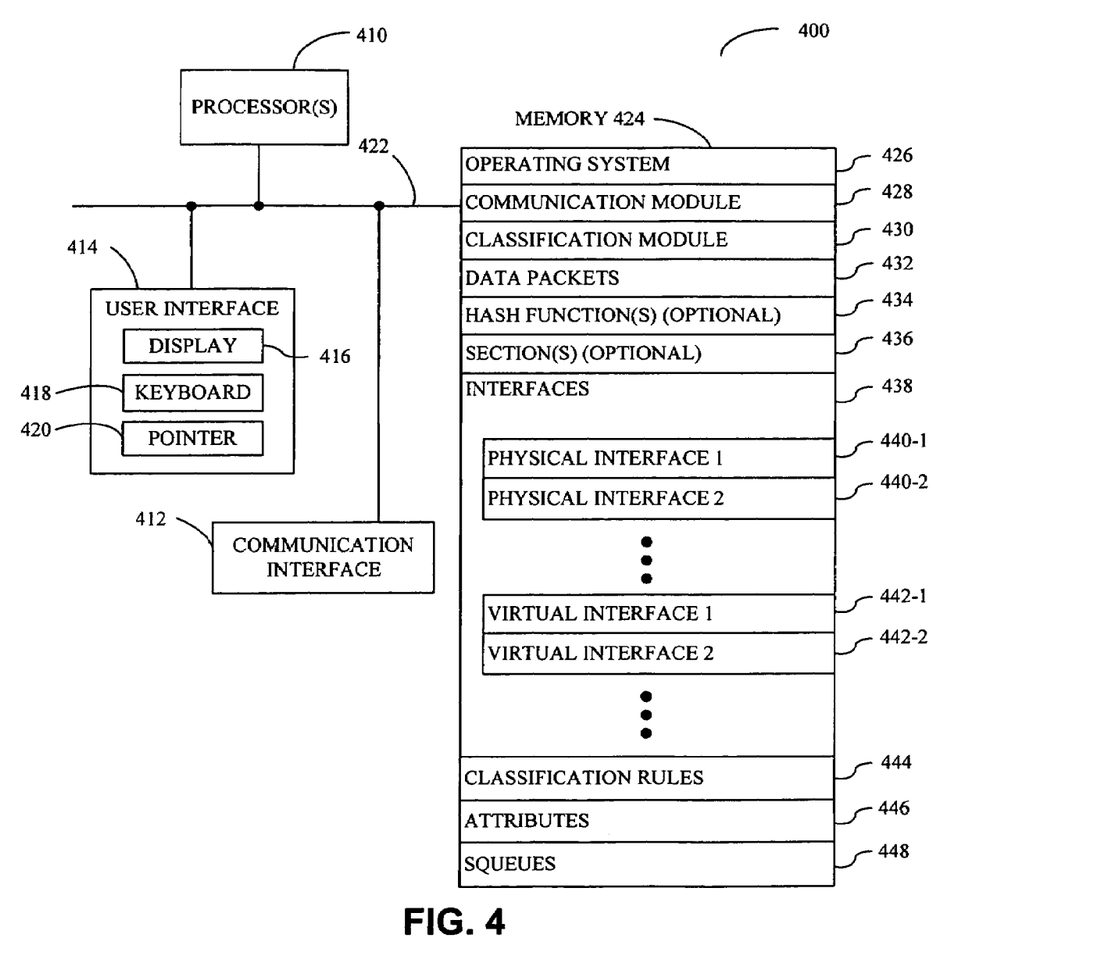
FIG. 4 is a block diagram illustrating a computer system in accordance with an embodiment of the present invention.

FIG. 4 provides a block diagram illustrating a computer system 400 (such as the system 200 in FIG. 2 and/or the system 300 in FIG. 3) in accordance with an embodiment of the present invention. The computer system 400 includes one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include a display 416, a keyboard 418, and/or a pointer 420, such as a mouse.

Memory 424 in the computer system 400 may include volatile memory and/or non-volatile memory. More specifically, memory 424 may include ROM, RAM, EPROM, EEPROM, FLASH, one or more smart cards, one or more magnetic disc storage devices, and/or one or more optical storage devices. Memory 424 may store an operating system 426 that includes procedures (or a set of instructions) for handling various basic system services for performing hardware dependent tasks. The memory 424 may also store communications procedures (or a set of instructions) in a communication module 428. The communication procedures may be used for communicating with one or more computers, devices and/or servers, including computers, devices and/or servers that are remotely located with respect to the computer system 400.

Memory 424 may also include one or more program modules (or a set of instructions), including classification module 430 (or a set of instructions). In addition, memory 424 may include data packets 432, interfaces 438, classification rules 444 (or a set of instructions), attributes 446, and/or squeues 448. The interfaces 438 may include physical interfaces 440 and/or virtual interfaces 442. In some embodiments, memory 424 includes one or more optional hash functions 434 and/or one or more optional sections 436. These may be used to pre-process the data packets 432.

Instructions in the various modules in the memory 424 may be implemented in a high-level procedural language, an object-oriented programming language, and/or in an assembly or machine language. The programming language may be compiled or interpreted, i.e, configurable or configured to be executed by the one or more processing units 410.

Although the computer system 400 is illustrated as having a number of discrete components, FIG. 4 is intended to be a functional description of the various features that may be present in the computer system 400 rather than as a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more ASICs and/or one or more digital signal processors DSPs.

Computer system 400 may include fewer components or additional components, two or more components may be combined into a single component, and/or a position of one or more components may be changed. In some embodiments the functionality of computer system 400 may be implemented more in hardware and less in software, or less in hardware and more in software, as is known in the art.

Figure 5:
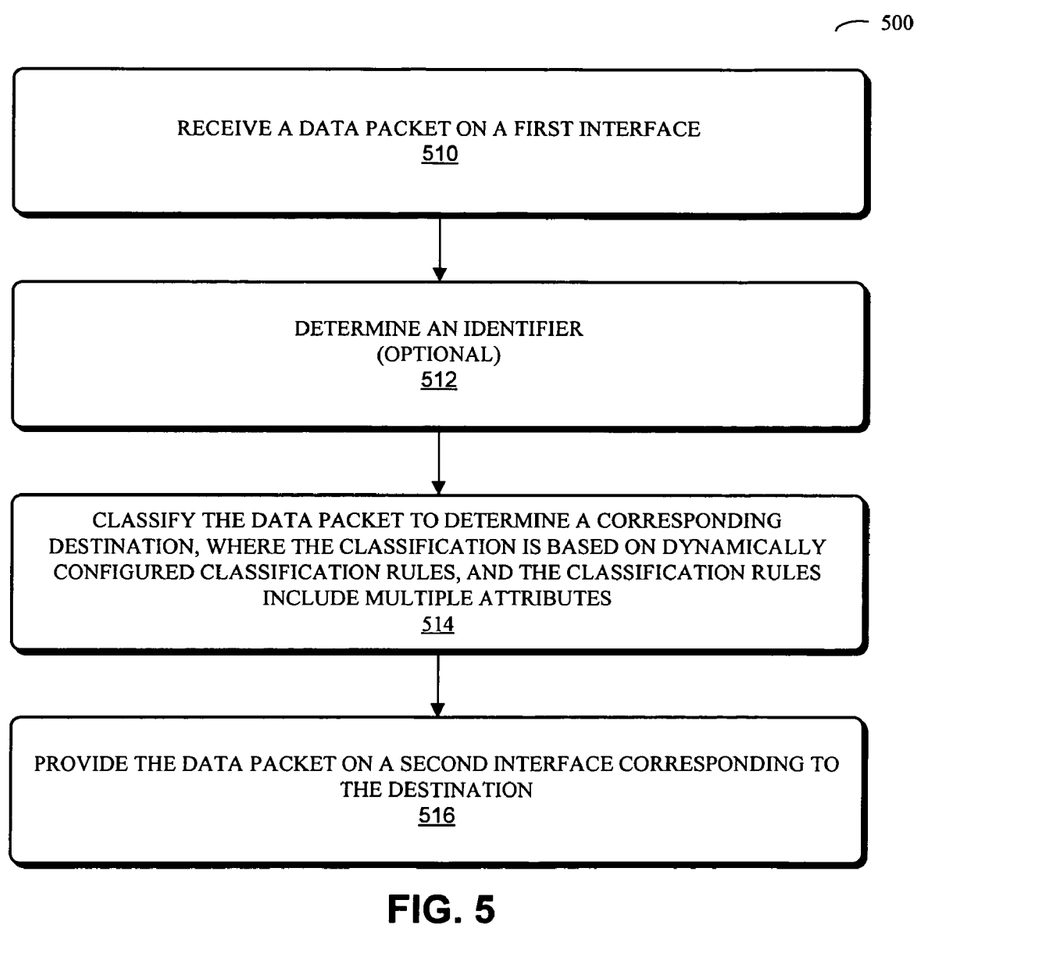
FIG. 5 is a flow chart illustrating a process for forwarding data packets in accordance with an embodiment of the present invention.

We now discuss methods for forwarding data packets. FIG. 5 provides a flow chart illustrating a process 500 for forwarding data packets in accordance with an embodiment of the present invention. During this process, the system receives a data packet on a first interface (510) and optionally determines an identifier (512). Then, the system classifies the data packet to determine a corresponding destination (514). This classification may be based on dynamically configured classification rules, which may include multiple attributes. Next, the system provides the data packet on a second interface corresponding to the destination (516). Note that in some embodiments there may be additional or fewer operations, the order of the operations may be changed, and two or more operations may be combined into a single operation.

Figure 6:
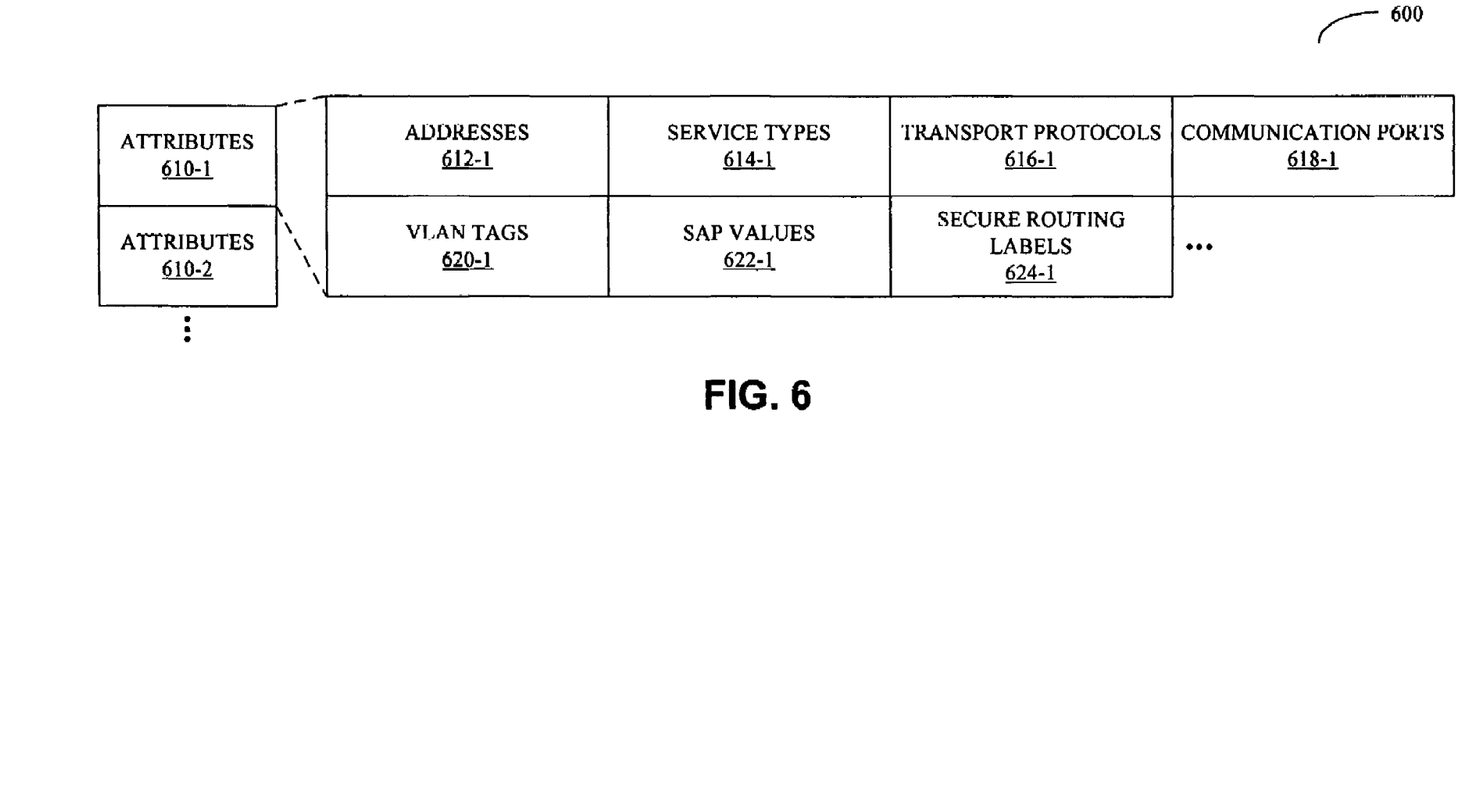
FIG. 6 is a block diagram illustrating a data structure in accordance with an embodiment of the present invention.

We now discuss data structures that may be used in the system 200 (FIG. 2), 300 (FIG. 3), and/or 400 (FIG. 4). FIG. 6 provides a block diagram illustrating a data structure 600 in accordance with an embodiment of the present invention. This data structure may include attributes 610. For example, attributes 610-1 may include one or more addresses 612-1, one or more service types 614-1, one or more transport protocols 616-1, one or more communication ports 618-1, one or more VLAN tags 620-1, one or more SAP values 622-1, and/or one or more secure routing labels 624-1. Note that that in some embodiments of the data structure 600 there may be fewer or additional components, two or more components may be combined into a single component, and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for forwarding data packets, comprising:
receiving a data packet on a first interface;
using dynamically configured classification rules to classify the data packet to determine a destination for the packet, wherein the classification rules include multiple attributes corresponding to multiple layers in an Open System Interconnect Reference model;
wherein the classification is based at least in part on a media access control (MAC)-level classification of the data packet, and wherein determining the MAC-level classification involves:
applying one or more hash functions to a portion of the data packet to generate a single hash value;
dividing the single hash value into multiple sections; and
determining the MAC-level classification based on the multiple sections; and
providing the data packet on a second interface corresponding to the destination.

2. The method of claim 1, further comprising providing the data packet on a third interface.

3. The method of claim 1, wherein the second interface includes two interfaces and the data packet is provided on at least one of the two interfaces.

4. The method of claim 1, wherein the first interface includes a physical interface or a virtual interface.

5. The method of claim 1, wherein the second interface includes a physical interface or a virtual interface.

6. The method of claim 1, wherein the multiple layers include a Data Link layer, a Network layer, a Transport layer, a Session layer, and/or an Application layer.

7. The method of claim 1, wherein the classification is further based on an address associated with the data packet.

8. The method of claim 1, wherein the multiple attributes include a type of service associated with the data packet.

9. The method of claim 1, wherein the multiple attributes include a transport protocol associated with the data packet.

10. The method of claim 1, wherein the multiple attributes include a communication port associated with the data packet.

11. The method of claim 1, wherein the multiple attributes include a virtual-local-area-network tag associated with the data packet.

12. The method of claim 1, wherein the multiple attributes include a MAC address associated with the data packet.

13. The method of claim 1, wherein the multiple attributes include a service-access-point value associated with the data packet.

14. The method of claim 1, wherein the multiple attributes include a label for secure routing associated with the data packet.

15. A computer program product for use in conjunction with a computer system, the computer program product comprising a a non transitory tangible computer-readable storage medium and a computer-program mechanism embedded therein for forwarding data packets, the computer-program mechanism including:
instructions for receiving a data packet on a first interface;
instructions for using dynamically configured classification rules to classify the data packet to determine a destination for the packet, wherein the classification rules include multiple attributes corresponding to multiple layers in an Open System Interconnect Reference model;
wherein the classification is based at least in part on a media access control (MAC)-level classification of the data packet, and wherein determining the MAC-level classification involves:
applying one or more hash functions to a portion of the data packet to generate a single hash value;
dividing the single hash value into multiple sections; and
determining the MAC-level classification based on the multiple sections; and
instructions for providing the data packet on a second interface corresponding to the destination.

16. A computer system, comprising:
a processor;
memory;
a program module, wherein the program module is stored in the memory and configured to be executed by the processor, and wherein the program module is for forwarding data packets, the program module including:
instructions for receiving a data packet on a first interface;
instructions for using dynamically configured classification rules to classify the data packet to determine a destination for the packet, wherein the classification rules include multiple attributes corresponding to multiple layers in an Open System Interconnect Reference model;
wherein the classification is based at least in part on a media access control (MAC)-level classification of the data packet, and wherein determining the MAC-level classification involves:
applying one or more hash functions to a portion of the data packet to generate a single hash value;
dividing the single hash value into multiple sections; and
determining the MAC-level classification based on the multiple sections; and
instructions for providing the data packet on a second interface corresponding to the destination.

17. The method of claim 1, wherein classifying the data packet involves:
determining whether hardware-based classification is applicable, and,
if so, using one or more hardware-based classifiers to classify the data packet,
otherwise, using one or more software classifiers to classify the data packet.

18. The method of claim 1, wherein determining the MAC-level classification based on the multiple sections involves using a Bloom filter to match the multiple sections to a corresponding node.

19. The method of claim 1, wherein the portion of the data packet includes at least one of an internet protocol (IP) destination address, a service type, or a protocol.

* * * * *